Figure 1:
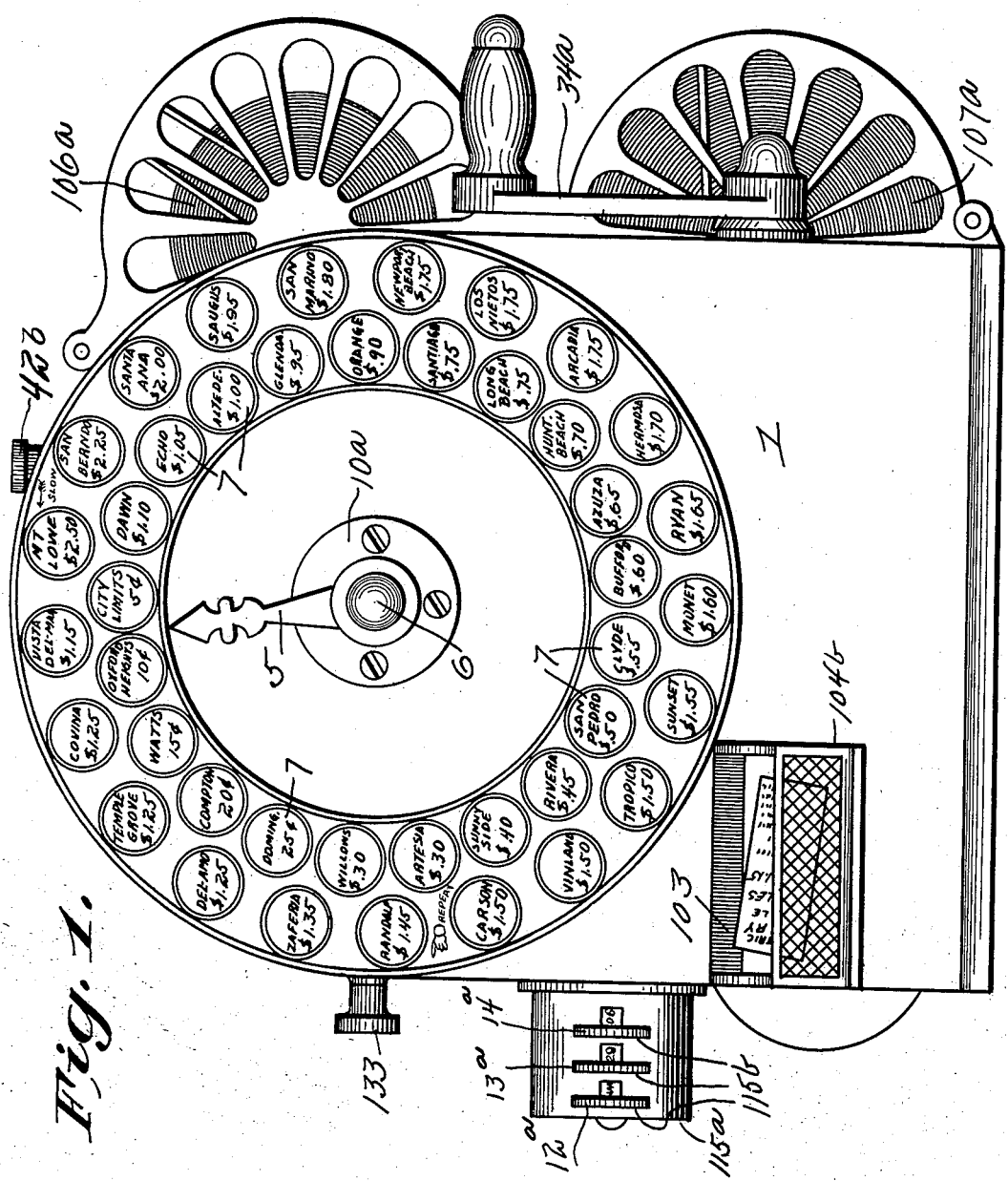

No. 886,743. PATENTED MAY 5, 1908.
H. TYLER.
TICKET ISSUING AND RECORDING MACHINE.
APPLICATION FILED APR. 23, 1907.

9 SHEETS—SHEET 1.

Witnesses

Inventor
Hiram Tyler
By
his Attorney

No. 886,743. PATENTED MAY 5, 1908.
H. TYLER.
TICKET ISSUING AND RECORDING MACHINE.
APPLICATION FILED APR. 23, 1907.

9 SHEETS—SHEET 2.

Witnesses
Matthew Siebler
E. M. Theobald.

Hiram Tyler,
Inventor
By R. J. McCarty
his Attorney

No. 886,743. PATENTED MAY 5, 1908.
H. TYLER.
TICKET ISSUING AND RECORDING MACHINE.
APPLICATION FILED APR. 23, 1907.

9 SHEETS—SHEET 3.

Witnesses
Matthew Liebler
C. M. Theobald.

Inventor
Hiram Tyler

By
R. J. McCarty
Attorney

No. 886,743. PATENTED MAY 5, 1908.
H. TYLER.
TICKET ISSUING AND RECORDING MACHINE.
APPLICATION FILED APR. 23, 1907.
9 SHEETS—SHEET 6.
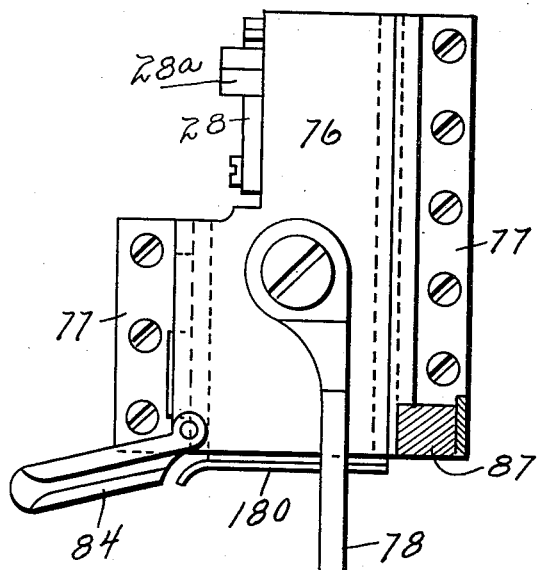
Fig. 6.
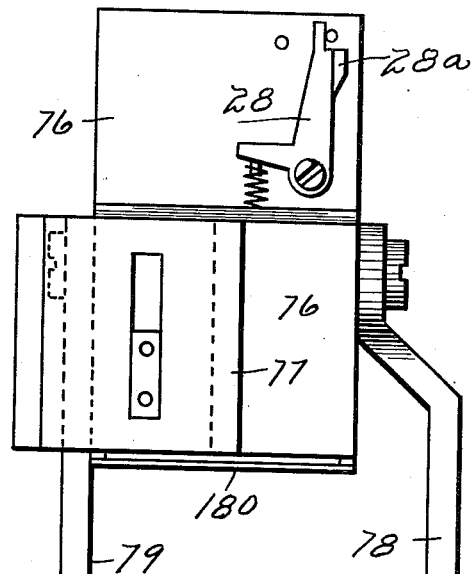
Fig. 7.
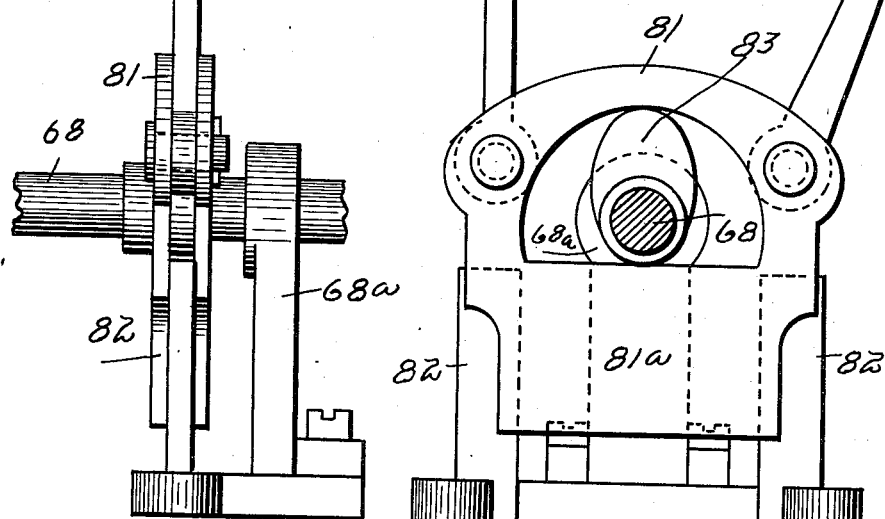

No. 886,743. PATENTED MAY 5, 1908
H. TYLER.
TICKET ISSUING AND RECORDING MACHINE.
APPLICATION FILED APR. 23, 1907.

9 SHEETS—SHEET 7.

Witnesses
Matthew Siebler
C. M. Theobald.

Inventor
Hiram Tyler.
By R. J. McCarty
his Attorney

No. 886,743. PATENTED MAY 5, 1908.
H. TYLER.
TICKET ISSUING AND RECORDING MACHINE.
APPLICATION FILED APR. 23, 1907.
9 SHEETS—SHEET 8.
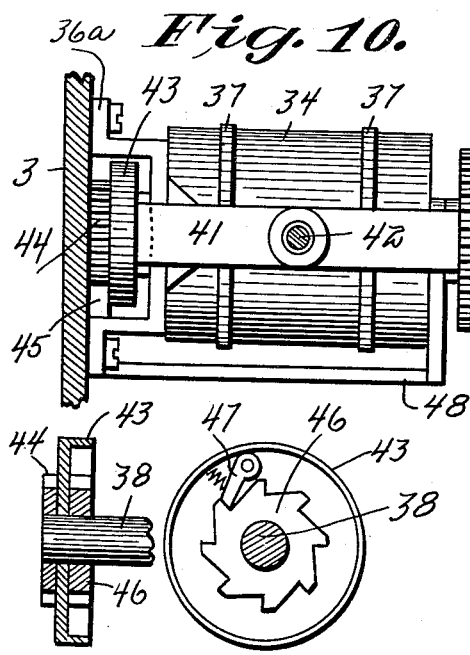
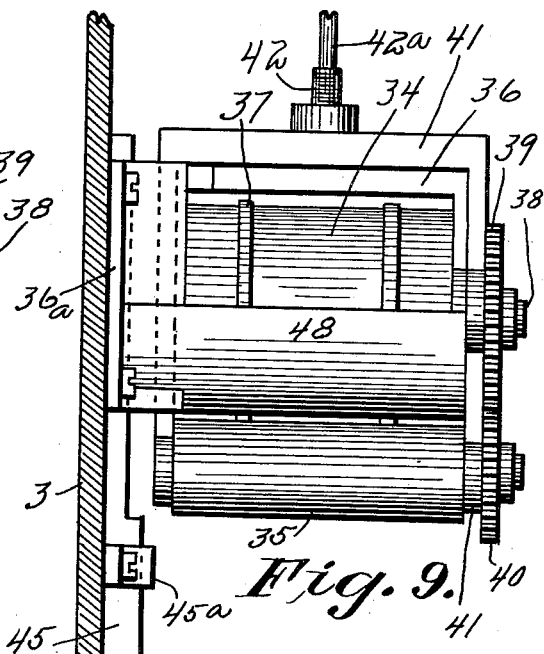
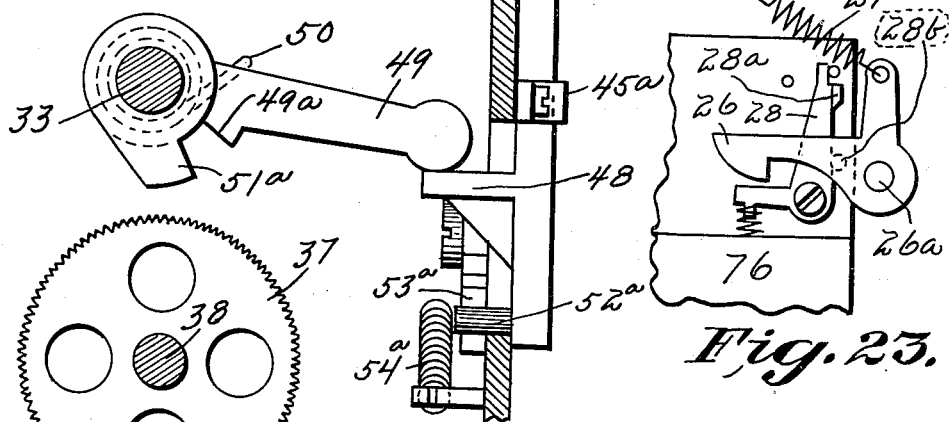
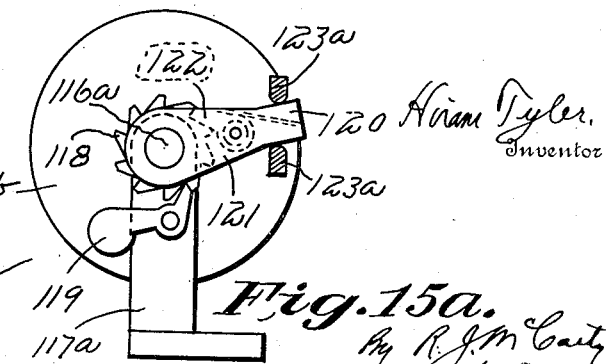

No. 886,743. PATENTED MAY 5, 1908.
H. TYLER.
TICKET ISSUING AND RECORDING MACHINE.
APPLICATION FILED APR. 23, 1907.
9 SHEETS—SHEET 9.
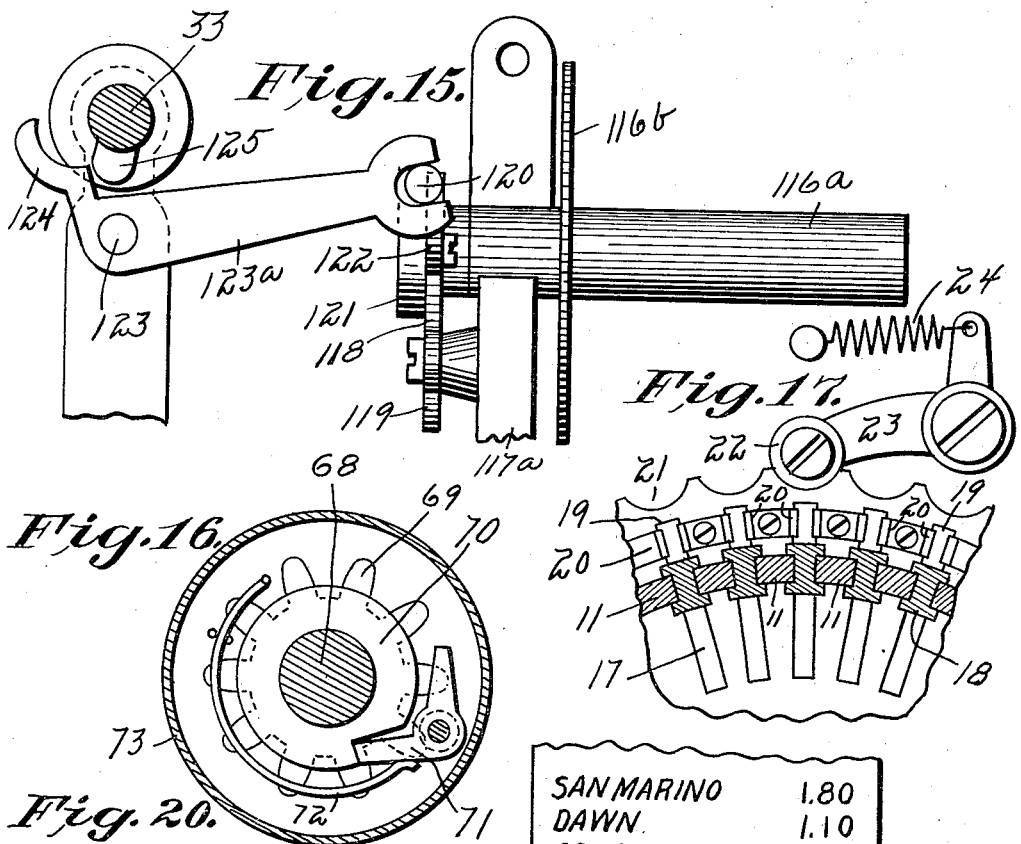
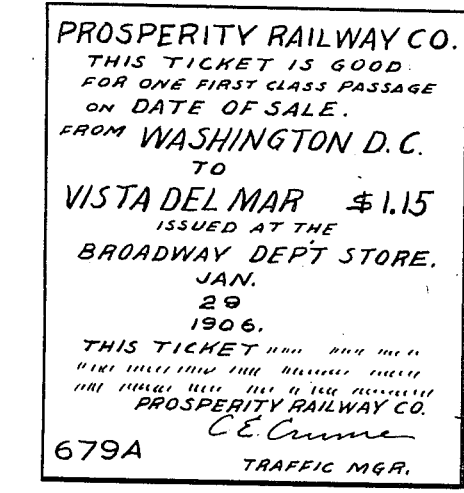

UNITED STATES PATENT OFFICE.

HIRAM TYLER, OF ATLANTA, GEORGIA.

TICKET ISSUING AND RECORDING MACHINE.

No. 886,743.   Specification of Letters Patent.   Patented May 5, 1908.

Application filed April 23, 1907. Serial No. 369,872.

*To all whom it may concern:*

Be it known that I, HIRAM TYLER, a citizen of the United States, residing at Atlanta, in the county of Fulton and State of Georgia, have invented certain new and useful Improvements in Ticket Issuing and Recording Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention comprises a machine for printing, recording and issuing railroad tickets, and is designed for use in ticket offices and is distinct from those machines which are carried on trains by conductors.

The object of the invention is to provide a machine for printing railroad tickets from one general roll of stock ticket paper, to any desired point or station on any given railroad, and to simultaneously record each printed and issued ticket.

A further object of the invention is to provide means for obviating the maintenance of a store room where immense quantities of ready-printed tickets are kept, which tickets are printed to read from one particular station to all of the stations, and each station in its turn to all other stations, which will be readily seen to require an enormous supply of printed tickets.

Briefly stated, the objects aimed at are accomplished by providing a ticket machine containing a rotatable drum or cylinder, carrying type bars so arranged that impressions may be taken from any particular type bar representing a specific station, on a blank form of ticket, validating the same by printing the day and date on said ticket, together with the name of the office issuing the particular ticket.

Many variations in mechanical details may be employed instead of those hereinafter described for carrying out my invention, therefore, I do not wish to limit myself to the exact details of construction illustrated and described herein. I deem it advisable, however, to provide a rotatable drum carrying type bars with raised type on one or two sides thereof, and a dial indicating the various stations along a rail-way line to which tickets are issuable, together with the tariff rate to said stations; a pointer fixed to the shaft of the drum and adaptable to be moved to indicate a station, and means for printing from said type bars the destination of each ticket; means for simultaneously printing the destination of each ticket, together with the tariff rate, on a record roll which is stored within the machine for subsequent inspection; means for validating each ticket issued, and means for issuing each ticket after they are printed, recorded and validated.

For convenience, the machine illustrated in the accompanying drawings, is designed for issuing a straight one-way ticket; for a round-trip ticket, it is only necessary to arrange the machine to take a double impression, from, to, and return, from, to. The station from which the original ticket is issued, is printed from a fixed type-bar in the machine, or can be printed on the stock-ticket roll, but the station to which the ticket is issued, is left blank on a stock-ticket roll and printed as required. It is not absolutely necessary to have any printing on the ticket form in advance, as all necessary data can be printed from a fixed type-plate in the machine, with the destination, station and validating stamp movable.

Preceding a detail description of the invention, reference is made to the accompanying drawings, of which—

Figures 2, 19:
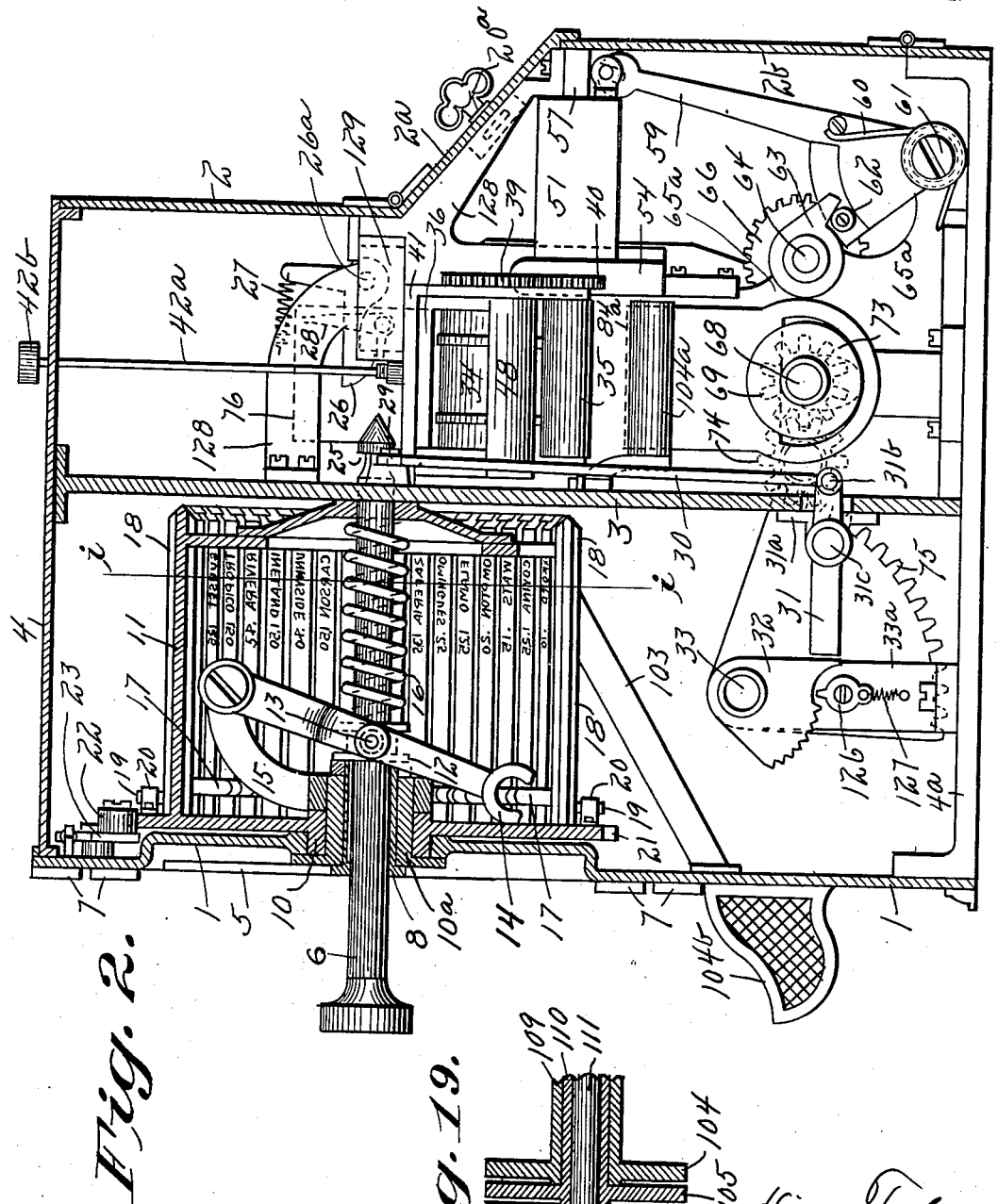
Figure 3:
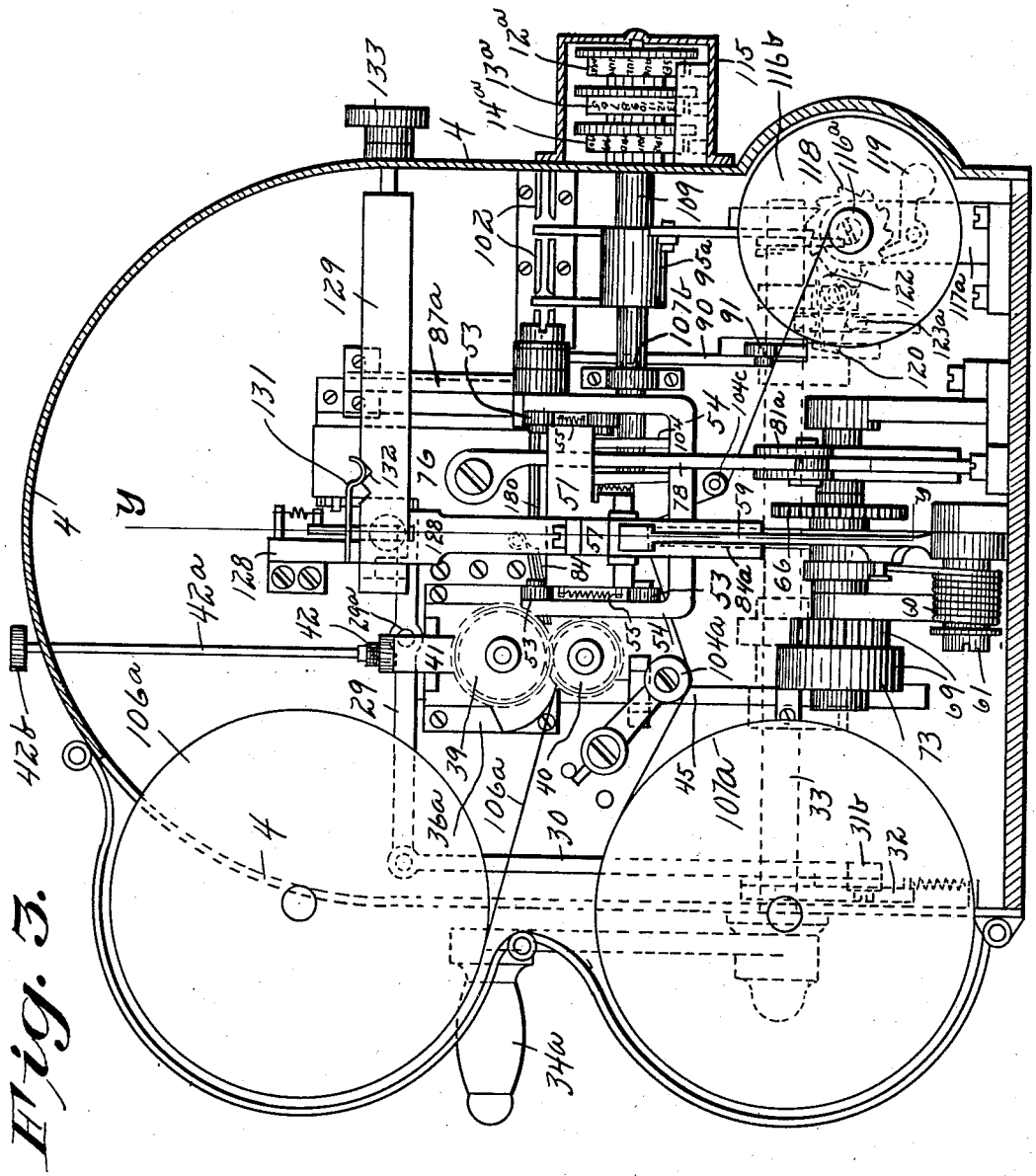
Figure 4:
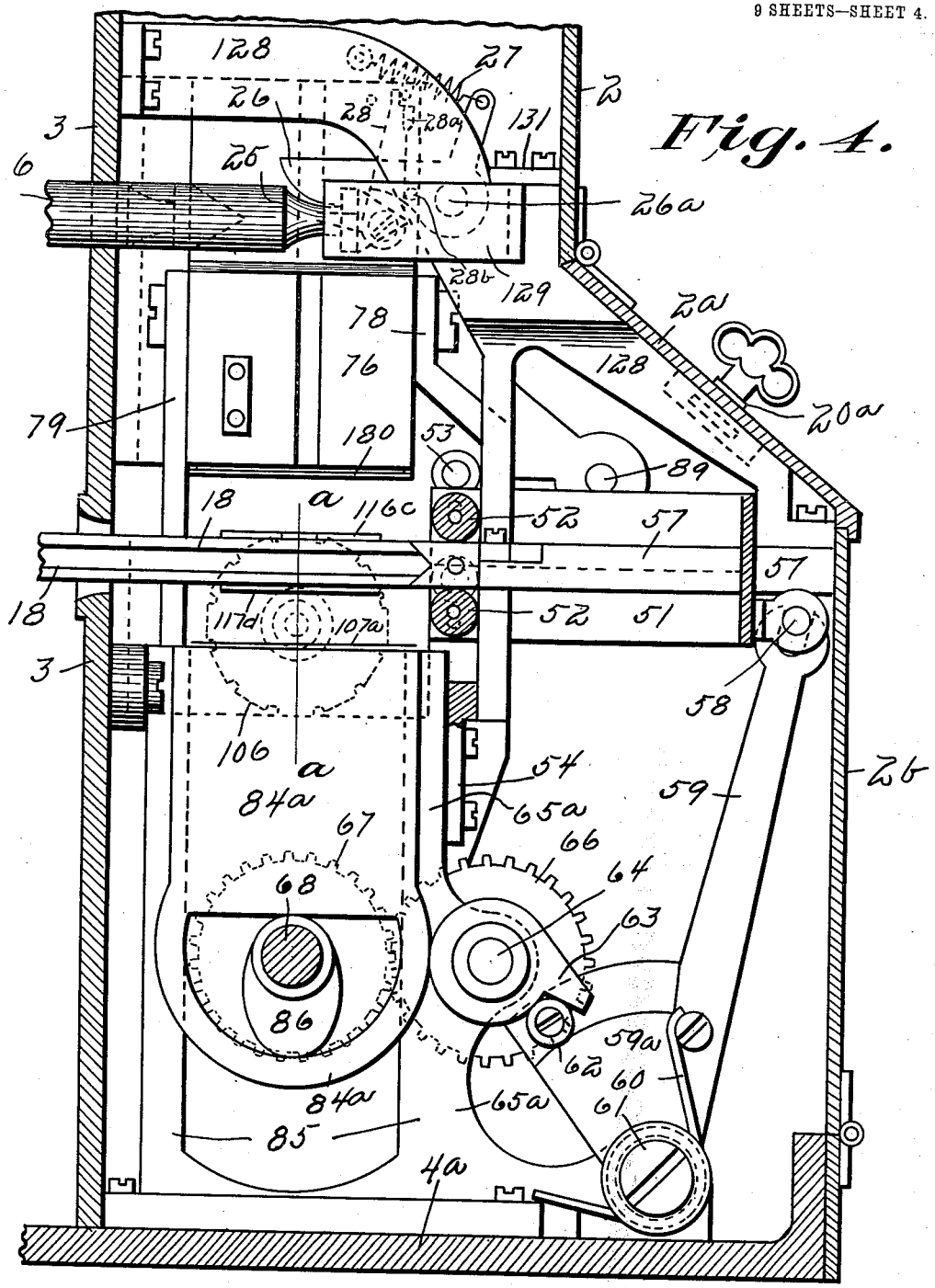
Figure 5:
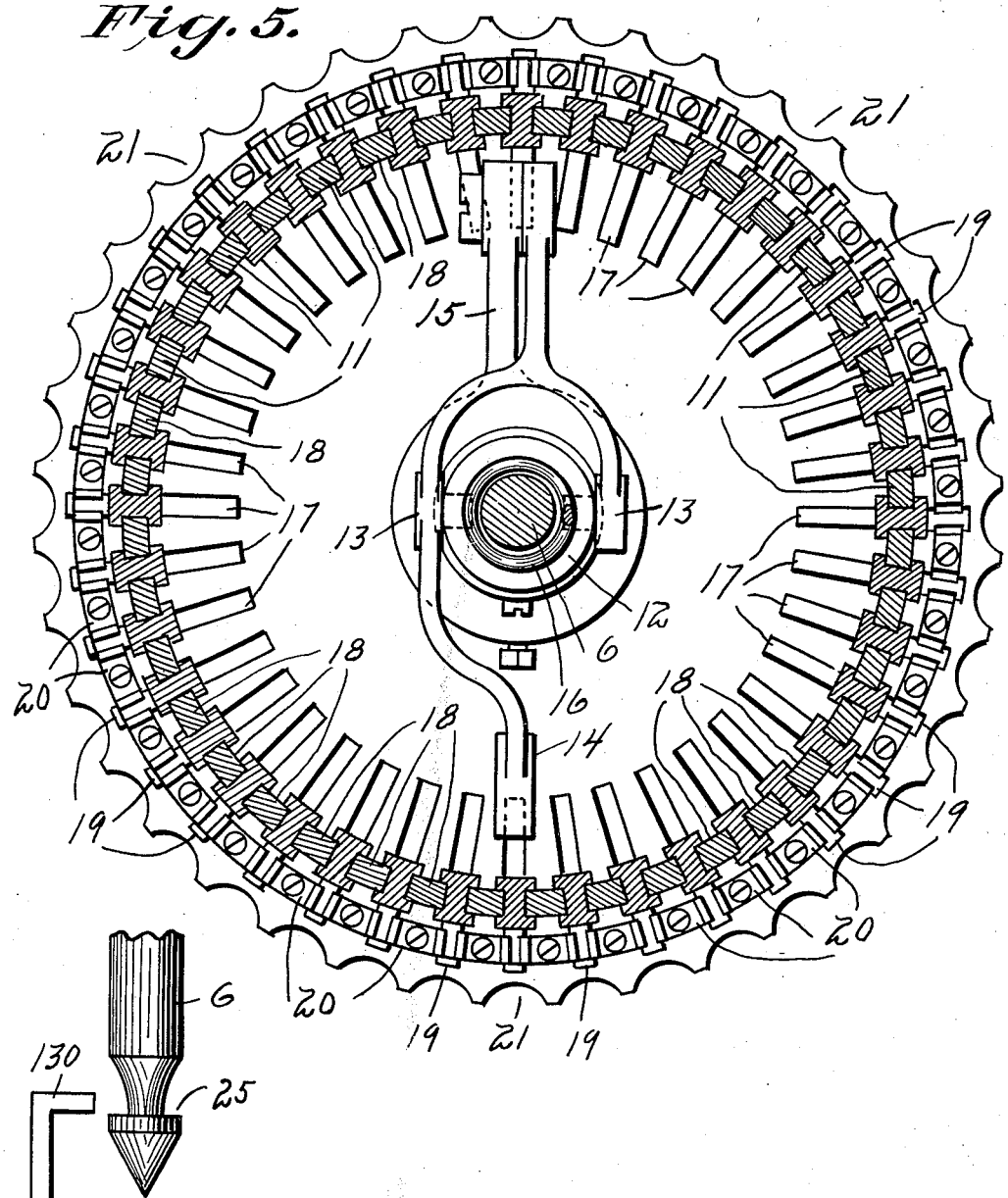
Figure 22:
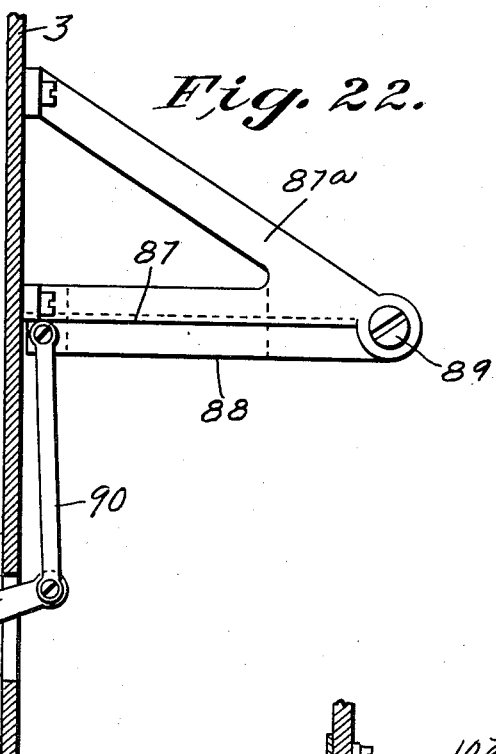
Figure 8:
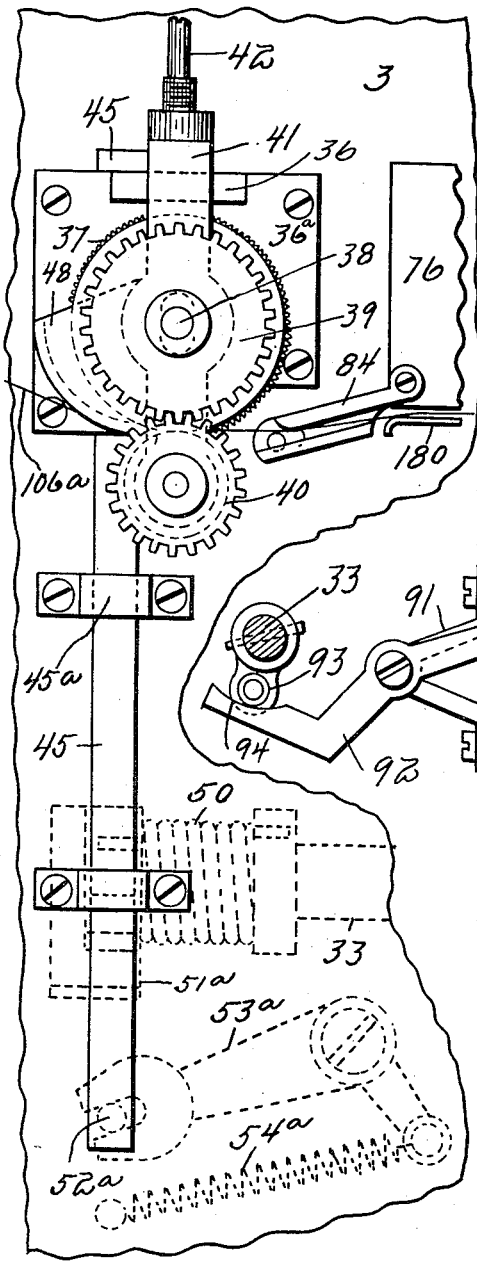
Figure 14:
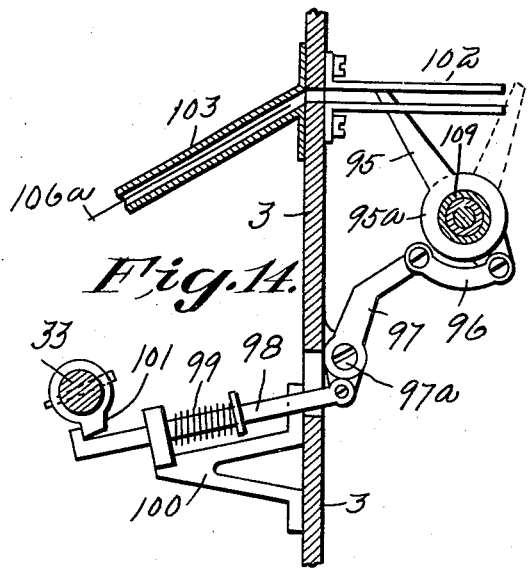

Figure 1, is a front elevation of the machine. Fig. 2, is a side elevation partly in section. Fig. 3, is a rear elevation. Fig. 4, is a section on the line $y$—$y$ of Fig. 3. Fig. 5, is a section on the line $i$—$i$ of Fig. 2. Figs. 6 and 7, are detail views of the upper platen and operating mechanism. Fig. 8, (Sheet 7) is a rear elevation of the paper-feeding mechanism for the ticket. Fig. 9, (Sheet 8) is a side elevation of the same. Fig. 10, is a top plan view of the same. Figs. 11, and 12, are detail views of the ratchet mechanism of the paper-feeding devices for the ticket. Fig. 13, is a detail view of one of the paper-gripping wheels of the paper-feeding devices. Fig. 14, is a detail view of the mechanism which ejects the tickets from the machine. Fig. 15, is a detail view of the mechanism for winding the record strip. Fig. 16, is a detail view of the ratchets for actuating the cam shaft through which the platens are actuated. Fig. 17, is a detail of a portion of the revolving type-bar head with devices for retaining it in each indexed position. Fig. 18, is a detail view of the mechanism through which duplicate tickets are issued. Fig. 19, is a detail sectional view of the type-wheels, and the coöperating type-bars. Figs. 20 and 21, are illustrations of a ticket and a portion of a record strip. Fig. 22, is a detail view of the cutting devices by which the tickets are severed from the strip. Fig. 23, is a detail of the mechanism whereby the type-bar setting-bolt is released.

In a detail description of the invention, similar reference characters indicate corresponding parts.

*Frame-work.*—The inclosing frame-work or casing is of suitable dimensions and may be of any preferred design. As illustrated in the drawings, it consists of a front plate 1 united to top and side plates 4 and a rear plate 2 with doors 2ª and 2ᵇ through which access is had to the interior of the machine through a lock 20ª, the said frame-work being united to a base 4ª. The interior of the casing or frame-work is divided by a partition 3 into two compartments as shown clearly in Fig. 2. Upon the front wall of the casing there is arranged a dial stationary in form and containing two concentrically-disposed indicators or rows of indicators 7 which indicate the various stations and the traffic rates thereto.

*Type-bar setting mechanism.*—This mechanism is illustrated in its assembled form in Figs. 2 and 5 of the drawing and consists of a rotatable head 11, the hubs 10 of which have bearings respectively, upon a bushing 10ª in the front wall 1 of the casing and upon the rearward portion of the type-bar-indexing bolt 6. Inclosed within the bearing 10ª is a sleeve or bushing 8 which provides a front bearing for the bolt 6 while the casing or partition 3 provides a rear bearing for said bolt. Fixed to the bolt 6 in front of the station indicator dial is a pointer 5 which is movable by hand to various positions to indicate the stations for which the tickets are to be issued; in the movement of this pointer 5, the drum 11 is correspondingly rotated to bring the selected type-bar 18 to the desired position from which it is moved longitudinally into a printing position by means presently described. The type-bars 18 are slidingly mounted in the periphery of the rotatable head 11, and upon each of such type-bars the name of a station, together with the tariff rate thereof is arranged in raised printing characters. These type-bars as will be seen in Fig. 5, are substantially T-shape in cross section and are slidingly supported, as before stated, in the rotatable head 11 owing to this formation. Projecting from the inner side of each of said type-bars is an arm 17, which, when a specific type-bar has been indexed by rotating the head 11, is brought to a position to be engaged by the forked end of an indexing lever 14 which is bifurcated to straddle the bolt 6 and is provided with trunnions 13 which project into opposite sides of a grooved collar 12 which is fixed to said bolt. The indexing lever 14 is fulcrumed upon a stationary arm 15 within the rotatable head 11, said arm being mounted upon the sleeve or bushing 10ª hereinbefore referred to, as the forward bearing for the rotatable head. The selected type-bar 18 having been thus brought to a position to be engaged by the indexing lever 14, the latter is actuated by the inward or rearward movement of the indexing bolt 6, and the said selected type-bar is moved into position for printing a ticket to the desired station. The ticket is illustrated in Fig. 20 (Sheet 9.) When each type-bar 18 is thus extended, it lies between and is supported upon guides 108 and 107 which are themselves supported upon the partition plate 3. In this extended position the type 116ᶜ on the upper face of the type bar 18 is in printing alinement with the date printing wheels 104—105 and 106 which are otherwise termed the "validating wheels". The guide bars 107 and 108, it will be understood serve as a common support for all of the type-bars 18, it being understood that only one type bar is extended to the printing position at a time. The upper sides of the guide bars 107 and 108 are provided with suitable type 116 and 117 to print any desirable matter to form a ticket. The validating type wheels 104—105 and 106 are telescoped by means of sleeves 109 and 110 upon shaft 111 which has its bearing in a side of the casing, also in a bracket 107ᵇ and in an extended portion of the guide 107—see Figs. 3 and 19. Further reference will be made to these validating-wheels and the means for indexing the same. Fig. 19, illustrates one of the type-bars 18 moved to a printing position and supported between the guide-bars 107 and 108. The printing devices shown in this figure of the drawings prints the ticket, while the type 117ᵈ on the lower side of the type-bar 18 prints the name of the station and the fare rate on the record strip, which operation will be again referred to. Each of the type bars 18 has a pin 19 projected from the front end thereof, which is engaged between two plate springs 20 and held in their inner positions when the type bars are moved to their normal positions within the rotating head 11. The springs 20 are mounted upon the inner side of the rotating head. The rear end of the indexing bolt 6 is pointed and immediately in the rear of said pointed end it is provided with a peripheral groove 25; when the bolt is moved rearwardly to index a selected type-bar 18, the pointed end thereof engages a latch 26 lifting the same and permitting said latch to interlock with the groove in the bolt and the bolt is thus held in position until released.

The retaining latch 26 is pivoted at 26ª to a bracket 128 which is supported from the partition 3 and the rear wall 2 of the casing.

The upper arm of said latch 26 is engaged by a spring 27 suitably secured and exerting pressure upon the latch to maintain it in engagement with the end of the indexing bolt 6. The peculiar shape of the bracket 128 is more clearly shown in Fig. 4 of the drawings. The printing operation is next referred to in connection with the means for releasing the indexing lever 6 from its rearward position where it is engaged by the latch 26. Carried upon the upper platen 76 is a trip or arm 28 which carries a pin $28^a$ which engages a pin $28^b$ on the latch 26 and lifts said latch; this engagement between the pins $28^a$ and $28^b$ occurs when the upper platen 76 reaches the limit of its elevation and immediately after the impression is made with the type devices shown in Fig. 19. The trip arm 28 is controlled by a spring which holds it in its normal position. When the latch 26 is thus caused to release the index lever 6, the latter is thrown forward by the spring 16 coiled there-around and therewith the previously indexed type-bar. The forward flange of the rotating head 11 is provided with a series of recesses 21 into which a roll 22 drops to temporarily maintain the head in each indexed position. The roll 22 is on an arm 23 pivoted to the front wall of the casing and normally controlled by a spring 24—see Fig. 17. It will be understood that when the rotatable head 11 is moved upon its axis, the interlocking roll 22 jumps in and out of the recesses until the head reaches the desired position.

Referring now to the means for indexing the validating wheels shown in Fig. 19, and hereinbefore referred to, the telescopic shafts of these wheels are extended on the exterior of the casing as shown in Figs. 1 and 3, and are provided with indicator wheels $12^a$—$13^a$ and $14^a$ with characters corresponding to those on the printing wheels, to-wit—the months, the dates thereof and the years. These exterior indicator wheels are inclosed within a casing 115 attached to a side of the main casing and have suitable slots $115^a$ therein for the fingers to engage knurled wheels adjacent to the indicator wheels and by which the indicator wheels are turned to index the validating type wheels.

*Paper-feeding mechanism for tickets.*—The roll of paper $106^a$ is mounted in a cage on the side of the casing and is carried into the machine between the feed rollers 34 and 35. Secured to the partition 3 is a stationary frame 36, said frame being secured by means of a flange $36^a$. This frame supports the journals 38 of the upper roller which has peripheral flanges 37 which grip the paper in the rotation of said roller. In Fig. 9, the space between the upper feed roller 34 and the lower roller 35 is clearly shown. The lower roller 35 is supported in an adjustable frame 41 independent of the stationary frame 36, by means of a screw 42, said screw extending in the form of a rod $42^a$ on the outside of the casing where it is provided with a knurled finger-piece $42^b$, and by which it is turned to adjust the position of said lower roller. The frame 41 extends downwardly at the ends of the upper roller 34 spanning the journals of the upper roller and extending in the form of a boss at its lower end to receive the journals of the lower roller—see Figs. 9 and 22. The said lower roller is driven from the upper roller 34 through gears 39 and 40. The upper roller 34 is rotated for each issuance of a ticket through the following instrumentalities. On the shaft 38 thereof there is fixed at one end a ratchet wheel 46 which lies within a crown disk 43 which is loose upon said shaft and which carries a spring-pressed pawl 47 which engages the ratchet wheel.

Fixed to the outer face of the crown wheel or disk 43 is a spur wheel 44 which is engaged by teeth on the upper portion of a rack bar 45 movable in guides $45^a$ on the partition 3. This sliding rack 45 has a projection 48 on its lower end which extends through an opening in the partition 3 and is engaged by the end of a lever 49 which is loose upon the main operating shaft 33; this shaft 33 is given the necessary rocking movement from a crank handle $34^a$ on the exterior of the casing and to be again referred to. Engaging the upper side of the lever arm 49 is a spring 50 which is wound around the shaft 33 and exerts a normal downward pressure on said lever arm. Fixed to the shaft 33 adjacent to the lever arm 49 is a finger $51^a$, which, in the rotation of the shaft 33 in one direction is caused to engage an abutment $49^a$ on the lever arm 49 and to lift said arm in a continued movement of said shaft and against the tension of the spring 50. As soon as the lever arm 49 is relieved of the influence of the spring 50, the rack bar 45 is elevated by a lever $53^a$ which is forked at its end to receive a stud $52^a$ projecting from the lower end of said rack bar and lying within the opening in the partition 3. The lever $53^a$ has one arm thereof connected with a coil spring $54^a$ which exerts a normal pressure to move the lever upward. The tension of the spring 50 exceeds that of the spring 45 so that when the finger $51^a$ has reached the limit of its movement and the lever arm 49 is again given over to the influence of the spring 50 by the return of the shaft 33 to its normal position, and at which time the lower spring $54^a$ has caused an elevation of the rack bar, the said rack bar is moved down by the lever arm 49 and spring 50 and is given the movement which feeds the ticket strip. This movement causes the spur wheel 44 and the crown wheel 43 to move and the shaft 38 to be likewise moved by the engagement of the ratchet pawl 47 with the wheel 46. It will be understood that in the upward movement of the rack bar under the influence of spring 54ª, the pawl will ride over the teeth of the ratchet wheel owing to the reverse movement of the gear 44 and the crown wheel 43 and pawl 47.

It will be understood that the downward or feeding movement of the rack bar 45 is sufficient to feed one length of the ticket strip suitable for a ticket. The ticket strip 106ª it will be noted in Fig. 22, passes beneath a guard 48 in entering between the roll and thence through a guide 84 to the underside of the upper platen 76, said paper being supported below the platen by a guard 180.

*Upper platen mechanism.*—The above mechanism is shown more clearly on Sheet 6. The upper platen 76 is movable in guides 77 in the partition 3 by means of pitmen 78 and 79, the former of which is given suitable form to clear the inking rollers to be presently referred to. The lower ends of said pitmen are suitably connected to a yoke 81 extending from a sliding frame 81ª which moves on guides 82 fixed to the bottom plate 4ª of the main frame or casing. Movable within the opening in the frame 81ª and engaging the lower surface of the yoke 81 is a cam 83 fixed to shaft 68, the latter shaft being supported in bearings 68ª. Upon a complete rotation of the cam shaft 68, the platen is drawn down, at which time the paper is carried with it to engage the printing devices shown in Fig. 19. It may be here stated that the guide 180 below the platen has suitable openings in it to correspond to the positions of the type characters. In the ascending movement of the platen which is caused by the cam 83 engaging the yoke 81, the paper upon which the impressions have been taken, is carried upward by the guide 180. It may be here incidentally remarked that upon the completion of this upward movement of the platen 76 the indexing bolt 6 is released from the retainer or latch 26 hereinbefore referred to. The cam shaft 68 has a continuous rotary movement which is imparted to it from the rocking movement of the main actuating shaft 33 through the following mechanism: Referring to Figs. 2 and 16. Fixed upon the cam shaft 68 is a housing 73 on the outside of which lies the spur wheel 69 fixed to a one-tooth ratchet wheel 70 lying within the housing, both spur and ratchet wheels being loose upon the shaft, but working together owing to their being rigidly united. 71 designates a ratchet pawl mounted upon the interior of the housing 73 and normally engaging the single tooth of the ratchet wheel 70 in which position it is held by a spring 72 also secured to the housing. Meshing with gear 69 is a transmission gear 74 which is actuated from a segment gear 75 fixed to the main shaft 33. The movement is imparted to the shaft 68 during the forward movement of the shaft 33 through the lever 34ª; this forward movement of the lever 34ª it will be remembered is the same movement which elevates the lever arm 49 shown in Fig. 9, and hereinbefore referred to. During the forward movement of the operating lever or crank 34ª, a complete rotation of the cam shaft 68 is made. In the reverse or back movement of said operating lever or crank the cam shaft 68 remains idle owing to the pawl 71 riding over the periphery of the ratchet 70. The shaft 68 also actuates the lower platen and the type-inking mechanism to be described under separate heading.

*Ticket cut-off mechanism.*—Referring to Fig. 22 on Sheet 7 of the drawings, after the ticket is printed, it is fed between guides 102—see Figs. 3 and 14. While lying within said guides the cutting operation takes place through the following devices: 87ª is the upper member of a bracket which is rigidly mounted on the partition 3 and the lower portion of which is formed into a knife edge 87 coöperating with which is a movable knife edge 88 pivoted to the bracket at 89. The movable knife edge 88 is connected by means of a link 90 to a lever 92 fulcrumed upon a bracket 91 supported upon the opposite side of the partition 3. The extended arm of said lever 92 has a cam surface 94 which is engaged by a roller 93 on an arm secured to the main operating shaft 33. The rearward movement of the crank or main operating lever 34ª actuates the lever 92 and closes the blade 88 to sever the ticket; it will be understood that the previous forward movement of the forward operating lever permitted the blade 88 to open upon its pivot by gravity, and while in such open position the previously printed ticket was fed into a position to be severed.

*Ticket ejecting mechanism.*—This mechanism is illustrated in Figs. 3 and 14. After the ticket has been severed from the strip in the manner and by the means above described, it is ejected from the machine by the following mechanism. Mounted loosely upon the outer telescopic shaft 109 hereinbefore referred to in connection with the validating printing wheels, are ejectors 95 upon a sleeve 95ª; these ejectors 95 work in slots at right angles to the guide 102; the guide 102 has been hereinbefore referred to, and it may be here stated that the said guide lies in the rear of the cutters 87 and 88 as shown in Fig. 22, and the ticket when severed lies within said guide and is ejected from said guide in a position at right angles to the direction in which it is fed into said guide. When the main shaft 33 is rocked by the forward movement of the main operating lever 34ª, the projection 101 releases the bolt 98 which is slidingly mounted in a bracket 100 mounted upon the partition wall 3. When the bolt 98 is thus released a coil spring 99 thereon moves said bolt rearwardly. Connected to the rearward end of the bolt 98 is a lever 97 having its fulcrum at 97ª upon a bracket secured to the opposite side of the partition 3.
Pivotally connected to the lever 97 by a link 96 are the ejectors or arms 95, so that when the bolt 98 is permitted to move rearwardly under the influence of spring 99, the ejector 95 is moved to a position to eject the ticket from the guide 102, such position being indicated in dotted lines.

As the ejector is shown in Fig. 14, a ticket has just been ejected from the guide 102 into the incline chute 103, from whence it passes into the basket 104ᵇ in the front of the machine as shown in Fig. 1. The ticket is thus ejected at the extreme end of the reverse movement of the operating lever 34ª.

*Lower platen mechanism.*—The lower platen 84ª is movable below the index typebar in guides 85 fixed to the base 4ª and the partition 3. The lower end of this platen is open to receive a cam 86 which is mounted upon the cam shaft 68 in a reverse position from that of the cam 83 for the upper platen. This lower platen 84ª being thus actuated from the cam shaft 68, it will be understood has its movement simultaneous with the upper platen. It will be further understood that the paper providing the record strip from which the record as shown in Fig. 21 is printed, is unwound from roll 107ª inclosed within a cage on a side of the machine below a guide roller 104, then over the lower platen 84ª and under a guide roll 104ª to the rewinding stud 116ª. The record strip it will be understood takes impressions from the type-bar alone, and from the type arranged from the lower side of said type-bar. The rewinding of the record strip after the printing of each record is accomplished through the mechanism illustrated in Figs. 3 and 15. The rewinding stud 116ª is mounted in bracket 117ª secured to the base of the machine, and upon said stud there is a disk 116ᵇ which guides the paper as rewound thereon. Intermittent movement is imparted to said stud from the main operating shaft 33 through the following mechanism: 125 is a cam upon a hub which is fixed to the shaft 33. Engaging the cam 125 in its rotation with the shaft 33, is a projected end 124 of a lever fulcrumed at 123 on a bracket extending from the base of the machine. The lever is bifurcated to receive the end 120 of arm 121 which is loose upon the end of the stud 116ª. The arm 121 carries a pawl 122 which engages the ratchet 118 to intermittently rotate the stud 116ª. 119 is the retaining pawl for the ratchet 118. The ratchet wheel 118 is mounted upon the projected end of the stud 116 and the retaining pawl 119 is mounted upon a stud projecting from the bracket 117ª.

*The inking mechanism.*—This mechanism is more clearly illustrated in Figs. 3 and 4 of the drawings, where there is shown a horizontally-reciprocating carriage 51 supported upon a guide 57 and rollers 53, the rollers 53 being mounted upon a frame 54, the said roller frame being mounted upon an extended portion 65ª of the platen guide. The carriage 51 supports the two inking rollers 52, the journals of which are mounted in slots in the sides of the carriage and are subjected to spring 55 pressure to maintain them in suitable contact with the printing characters. The upper roller 52 is of suitable length to apply ink to all of the type devices shown in Fig. 19 and which have been hereinbefore described, while the lower roller 52 is designed only to apply ink to the type characters on the lower sides of the type bars 18. The reciprocating movement of the carriage is had from a lever 59 which is connected at 58 to said carriage and has its fulcrum at 61. A spring 60 exerts a normal pressure upon the lever 59 to maintain the carriage in the position shown in Fig. 4.

59ª indicates an extension from the lever supporting a roll stud 62; this roll stud is adapted to be engaged by a cam 63 fixed to shaft 64. Upon this shaft 64 there is a spur gear 66 which is engaged by a spur gear 67 on the cam shaft 68. It will thus be seen that in the actuation of the cam shaft through the means hereinbefore described, the cam 63 will engage the roll stud 62 and advance the inking roller carriage to ink the printing devices, and the lever 59 will return said carriage to its initial position as shown in Fig. 4. This operation of the inking roller carriage takes place in the movement of the operating lever 34ª in the direction of the front of the machine. In other words, in the movement of the cam 86 from the position shown in Fig. 4, to the horizontal position in which it engages the upper portion of the platen frame 84, the inking roller carriage 51 is moved to a position to ink the type characters and is returned to the position shown in Fig. 1.

*Mechanism for issuing duplicate tickets.*— As the machine has been thus far described, it is apparent that in order to print and issue two tickets to the same point of destination and in close succession, two complete operations of the indexing bolt 6 would be necessary, owing to the retaining latch 26 disengaging the bolt upon the upper movement of the platen as hereinbefore described. In order to obviate the necessity of these two separate operations of the bolt 6, in printing and issuing tickets to the same point of destination, or more than two tickets, I provide means illustrated in Fig. 3, and in Fig. 18 on Sheet 5 of the drawings. These means consist of a sliding retainer or lock 129 which is operated by a push button 133 from the outside of the machine cabinet. The retainer

129 is supported in a sliding manner in a side wall 4 of the casing and in the bracket or frame 128. The said retainer has an extension or hook 130 which is in a position to enter the peripheral groove 25 in the end of the indexing bolt 6 when said retainer is shifted by the button 133 to a position to effect such an engagement. The said retainer is held in an operative position by a plate spring 131 which is mounted upon the frame or bracket 128, and the end of said spring is shaped to enter one or the other of the notches 132 in the upper side of the retainer and to thus hold said retainer in either of its two positions; one of said positions being that in which the end 130 thereof engages the head of the indexing bolt, and the other position being that in which said parts are free from such engagement.
It will be understood that when the retainer 129 is interlocked with the indexing bolt, said bolt is held against the tension of its spring 16 and the releasing of the latch 26 by the upward movement of the platen, as hereinbefore described, will take place without affecting said bolt; this is the condition as long as the retainer 129 is permitted to remain interlocked with the head of the bolt.

*Full - stroke mechanism.*—Well - known means for insuring the completeness of each operation of the main actuating shaft is shown in Figs. 2 and 3 of the drawings, and consists of a segment ratchet 32 which is fixed to the shaft 33 in a depending position.
Adapted to engage the teeth of said ratchet, is an upwardly-pointing pawl 126 which is pivoted to one of the bearings 33ª of the shaft 33 and is held in a vertical position by a spring 127. The segment 32 on one side of the teeth is recessed in order to permit the pawl 126 to stand in the vertical position as shown in Fig. 2 when the ratchet is in one position. The operation of this device is commonly understood. When the ratchet segment 32 is initially moved to engage said pawl on one or the other edge of said ratchet, the movement must be continued until the full extent of movement has been imparted to said ratchet.

*Means for preventing the issuance of a mutilated ticket.*—This mechanism is illustrated in Figs. 2 and 3 of the drawings, and comprises a locking bar 29 which has a fulcrum on a stud 29ª on the rear of the casing and is connected with a link 30 at its outer end. The link 30 is pivoted at 31ᵇ to the rear end of the stop bar 31 which is fulcrumed at 31ᶜ on a bracket 31ª attached to the partition 3. When the stop bar 31 is in its normal position as in Fig. 2, it lies in a position to prevent an operation of the main shaft 33 owing to said stop bar being in a position to engage the ratchet segment 32. The inner end of the locking bar 29 lies normally within the peripheral groove 25 on the inner end of the indexing bolt 6. When the indexing bolt is pushed inwardly to index a selected type bar 18, the locking bar 29 is actuated by the tapered surface of the groove 25 and is caused to move upon its fulcrum 29ª; this movement likewise elevates the connecting link 30 and removes the stop bar 31 out of the path of the segment ratchet 32 and the machine may then be operated.

It will be understood that in the event the indexing bolt 6 is moved inwardly sufficiently to cause this operation of said locking bar 29 and its connections, but is not moved in sufficiently to complete the indexing movement of a type bar and is released, the tension of spring 16 will return said indexing bar to its outer normal position and the locking bar 29 and its connected parts to their normal positions as shown in Fig. 2.

An operation of the machine is briefly outlined as follows: It being desirable to print and issue a given ticket for example, a ticket to visit Delmar, the index hand 5 is moved to the individual indicator 7 on the dial as shown in Fig. 1. This movement of said hand correspondingly rotates the head 11 carrying the type bars to bring the type bar for that specific point in a position to be indexed. The indexing bolt 6 is then pushed inwardly to move the selected type bar into printing alinement with the other printing characters which have been previously set, and said indexing bolt is engaged by the latch 26 and is held in such position until released by the rise of the platen. The forward movement of the operating lever 34ª inks the type characters and actuates the upper and lower platen to print the ticket; the reverse movement of said operating lever severs the paper or ticket and ejects the same and feeds the paper for the next operation of printing a ticket.

I claim:

1. In a ticket-printing and issuing machine, a station dial, and pointer, a series of type bars rotatable in a body to bring a selected type bar into a position for further movement, means for moving said selected type bar longitudinally after being moved to such position, and means for printing tickets from opposite sides of said type bar, said tickets containing duplicate impressions of the points of destination and the fare.

2. In a ticket-printing and issuing machine, a dial upon which various stations are indicated, a pointer adapted to indicate the stations on said dial, a series of type bars having printing characters on opposite sides, said type bars being rotatable in a body simultaneously with the movement of the indicator pointer to bring a selected type bar into a position from which it is moved to a printing position, means for so moving said type bar, and means for printing tickets from said type bar after being moved to a printing position, said tickets containing duplicate impressions of the points of destination and the fares.

3. In a ticket-printing and issuing machine, a dial upon which various stations are indicated, a series of type bars mounted upon a rotatable head and each of which has printing characters on opposite sides thereof, means for simultaneously rotating the head to bring a selected type bar into a position for further movement, and indicating the ticket to be issued on said dial, means for imparting further movement to the selected type bar to bring it to a position to print tickets containing duplicate impressions of the points of destination and the amount of the fare, and means for printing such tickets.

4. In a ticket-printing and issuing machine, a dial upon which various stations are indicated, a series of type bars mounted upon a rotatable head and each of which contains printing characters on opposite sides corresponding with the indications on the dial, means for simultaneously indicating a selected station on the dial and moving a selected type bar to a position to receive further movement, means for moving said selected type bar to a position to print tickets showing in duplicate the points of destination and the amount of the fare, and printing devices for printing said tickets from the type bar after the latter has been moved to its second position.

5. In a ticket-printing and issuing machine, a dial upon which various stations are indicated, a rotatable head, a series of type bars mounted upon said head and each of which has printing characters on opposite sides for printing duplicate tickets, a pointer to indicate a selected station on the dial and to simultaneously rotate the head to bring the type bar for said ticket in a position for further movement, means comprising a longitudinally-movable member adapted to move the selected type bar to a position to print tickets containing duplicate impressions of the points of destination and the amount of the fare, and means for engaging the type on the opposite sides of said type bar to print such tickets.

6. In a ticket-printing and issuing machine, a dial upon which the various stations are indicated, a rotatable head, a series of type bars slidingly mounted in said head and each of which is provided with duplicate type, means for simultaneously indicating on the dial a selected station and for rotating the head to bring the type bar of such station into a position for a further movement, means for moving said type bar longitudinally to a position to print tickets containing duplicate impressions of the points of destination and the fares, means for supporting said type bar in such position, and means for impressing the type bar from opposite sides to print such tickets.

7. In a ticket-printing and issuing machine, a dial upon which various stations are indicated, a rotatable head, a series of type bars each having double printing characters corresponding with an indication on the dial, a pointer movable to indicate a selected station on said dial, connections between said pointer and the rotatable head whereby said head is actuated during the movement of the pointer to bring a type bar to a position from which it is further moved, means for imparting such movement to said type bar, and printing devices engaging the opposite sides of the type bar to print tickets as shown on the indicating dial, such tickets containing duplicate impressions of the points of destination and the fare value.

8. In a ticket-issuing machine, a dial upon which the various stations are indicated, a series of type bars rotatable in a body and containing type characters on opposite sides corresponding to the stations indicated upon the dial, a pointer adapted to be moved to a position to indicate a selected station on the dial and to simultaneously actuate the type bars in a body to bring the type bar of the station indicated to a position for subsequent movement to a printing position, means for moving said selected type bar to a printing position, and means for impressing the type characters on opposite sides of said bar to print a ticket to the station indicated and a record of said ticket to be retained within the machine.

9. In a ticket-printing and issuing machine, a dial upon which various stations are indicated, a series of type bars having printing characters in duplicate thereon corresponding to the stations on the indicator, means for simultaneously indicating a selected station on the indicator and moving the type bar thereof to a position for further movement, means for imparting said further movement to said type bar, printing devices for engaging said type bar on opposite sides to print a ticket for the station indicated, and another ticket containing a duplicate impression of said station and the amount of the fare, and means for severing one of said tickets to be delivered from the machine.

10. In a ticket-printing and issuing machine, an indicator upon which the various stations are indicated, a rotatable head, a series of type bars mounted in said head and adapted to independent longitudinal movement therein, means for simultaneously indicating on the dial a station and for rotating the head to a position to bring the type bar for such station into a position for further movement, means for longitudinally moving said type bar to such further position, printing devices for printing tickets from said type bar after the latter has been so moved, means for storing one of said tickets within the machine, and means for issuing the other of said tickets from the machine.

11. In a railway ticket-printing and issuing machine, a dial containing a plurality of station indications, a plurality of type bars corresponding with said station indications, means for rotating said type bars in a body to bring a selected one of said type bars into a position for a second movement, means for simultaneously indicating the station of said type bar, means for imparting the second movement to said type bar, and means movable against said type bar after the latter has received its second movement and while it is stationary, and whereby a ticket is printed from both sides of said type bar.

12. In a ticket-printing and issuing machine, a dial containing station indications, a series of type bars mounted upon a rotatable head, each of said type bars having duplicate printing characters on opposite sides thereof, means for simultaneously indicating a selected station and moving the type bar thereof to a position for a second movement, means for imparting a second movement to said type bar to move it in advance of the remaining type bars, and upper and lower printing devices simultaneously movable and adapted to print a ticket from said type bar as shown upon the indicator.

13. In a ticket-printing and issuing machine, a dial upon which stations are indicated, a pointer to indicate said stations, type bars, means for rotating said type bars in a body, means for moving one of said type bars longitudinally after said type bars have been rotated in a body, printing devices actuated to engage said type bar after its longitudinal movement and to print a ticket therefrom, and devices for validating said tickets.

14. In a ticket-printing and issuing machine, a dial upon which railway stations are indicated, a series of individual type bars mounted upon a rotatable head and each one of which has an individual longitudinal movement, means for rotating said type bars to bring a selected one into a position to receive such longitudinal movement, means for imparting the longitudinal movement to said type bar, means for supporting said type bar in such position for printing, and means for printing tickets from said type bar when so supported.

15. In a ticket-printing and issuing machine, a dial upon which various stations are indicated, a series of type bars having double printing characters corresponding to the indications on the dial, a rotatable head upon which said type bars are mounted and in which they have sliding movements, an indicator pointer, means movable therewith to rotate the type bar head to move a selected type bar to a position to receive a second movement, means for imparting to said type bar its second movement, printing devices movable to said type bar and adapted to print tickets therefrom, and means for returning said type bar to its normal position in the head.

16. In a ticket-issuing and recording machine, a series of printing devices, a dial upon which are indicated the various stations as per the printing devices, a pointer adapted to indicate the stations and to concurrently move the printing devices thereof to their initial operative positions, ticket-validating printing devices, means for moving the printing device of an indicated station in printing alinement with said validating printing device, and means for printing a ticket from said printing device and validating device and making a record thereof within the machine.

17. In a ticket-issuing and recording machine, a dial upon which are indicated the various stations, a series of type bars for printing the names of said stations and the tariff rates thereto, a pointer movable to positions to indicate a station and to move the type bar thereof to a position from which it is subsequently moved, means for imparting such subsequent movement to said bar to bring it into a printing position, ticket-validating devices in alinement with said bar when the latter is so moved, means for printing tickets from said bar and devices and for storing one of said tickets, means for severing said tickets so printed, and means for ejecting one of said tickets from the machine.

18. In a railway ticket-printing and issuing machine, a dial upon which various stations are indicated, a series of type bars having duplicate printing characters of the indicated stations, a rotatable head upon which said type bars are individually and slidably mounted, means for rotating said head to bring a selected type bar into position to receive a further setting movement, means for longitudinally moving said type bar to a set position, ticket-validating devices, and means for printing tickets from said type bar when in its set position, means for validating and issuing one of said tickets, and means for storing the other of said tickets in the machine.

In testimony whereof I affix my signature, in presence of two witnesses.

HIRAM TYLER

Witnesses:
V. E. SATTERFIELD,
C. A. MIMS.